March 3, 1964   D. KATZ   3,123,121
ANTI-SKID MEANS FOR AUTOMOTIVE VEHICLES
Filed Aug. 7, 1962   7 Sheets-Sheet 1

David Katz.
INVENTOR

March 3, 1964  D. KATZ  3,123,121
ANTI-SKID MEANS FOR AUTOMOTIVE VEHICLES
Filed Aug. 7, 1962  7 Sheets-Sheet 7

David Katz
INVENTOR

United States Patent Office 3,123,121
Patented Mar. 3, 1964

3,123,121
ANTI-SKID MEANS FOR AUTOMOTIVE VEHICLES
David Katz, 506 W. 35th St., Wilmington, Del.
Filed Aug. 7, 1962, Ser. No. 215,416
11 Claims. (Cl. 152—214)

This invention relates to anti-skid means for automotive vehicles which travel on wheels having pneumatic tires. It is an object of this invention to provide a novel means whereby to control the tendency of such a vehicle toward skidding on ice or toward spinning its wheels in a snow bank, whereby to safely steer the vehicle on icy pavement and to enable its starting without difficulty in deep or fresh snow. A further object is to provide means as aforesaid which are permanently attached to the vehicle and which may be operated from the driver's seat, off and on, as need arises, without getting out of the car and preferably even without stopping the vehicle. Other objects and achievements of this invention will become apparent as the description proceeds.

The customary method hitherto of combatting said skidding and spinning tendencies has been to put chains on the tires. This operation is not only an arduous task, not achievable for instance by persons in poor health or when dressed in fine clothes, but is also a poorly controllable operation, inasmuch as the putting on of chains requires stopping the vehicle in a safe place and the operator's leaving his seat to perform the operation. As a result of this, chains are generally put on just once during each snowfall, or during each long trip. Should the route take the vehicle alternately through areas which are covered with snow or ice and areas which are clean and dry, the driver has to choose between and endure the lesser of two evils. Either he drives without chains, risking skidding or stalling in certain areas, or he puts them on and has a rough ride on the dry stretches.

Now, my present invention overcomes said evils by providing the vehicle with permanently attached spin-impeding means which are normally out of engagement with the tires but which are readily movable into operative position by cables, lever devices, electromagnets, pneumatic, hydraulic or other actuating means which are readily operable from the driver's seat.

In general terms my novel device comprises a combination of several subsidiary mechanisms or means, each adapted to perform its own function but all cooperating together to achieve the summary goal of providing means controllable from the driver's seat for permitting travel on snow or ice. These several subsidiary means may be generally catalogued as follows:

(I) Friction increasing means adapted to be moved into a position of contact with the ground, underneath the tire tread or in proximity thereto, whereby they will offer increased resistance to uncontrollable wheel movement such as spinning or skidding. These means are intended to be applied primarily to the tires of the drive wheels (customarily the rear wheels of a four-wheel vehicle) and to be applied thereto from the region adjacent the inward face of each tire.

(II) Clutch means for moving and holding said first means fast against the tire so that they will rotate with the latter, and means for releasing said hold.

(III) Means for returning said friction fingers automatically to an inactive, normal position, after said clutch means have been released, and (IV) Means operable by the driver, without leaving his seat, for actuating said clutch means II.

For further details, reference is now made to the accompanying drawings, in which.

Figures 1, 2:
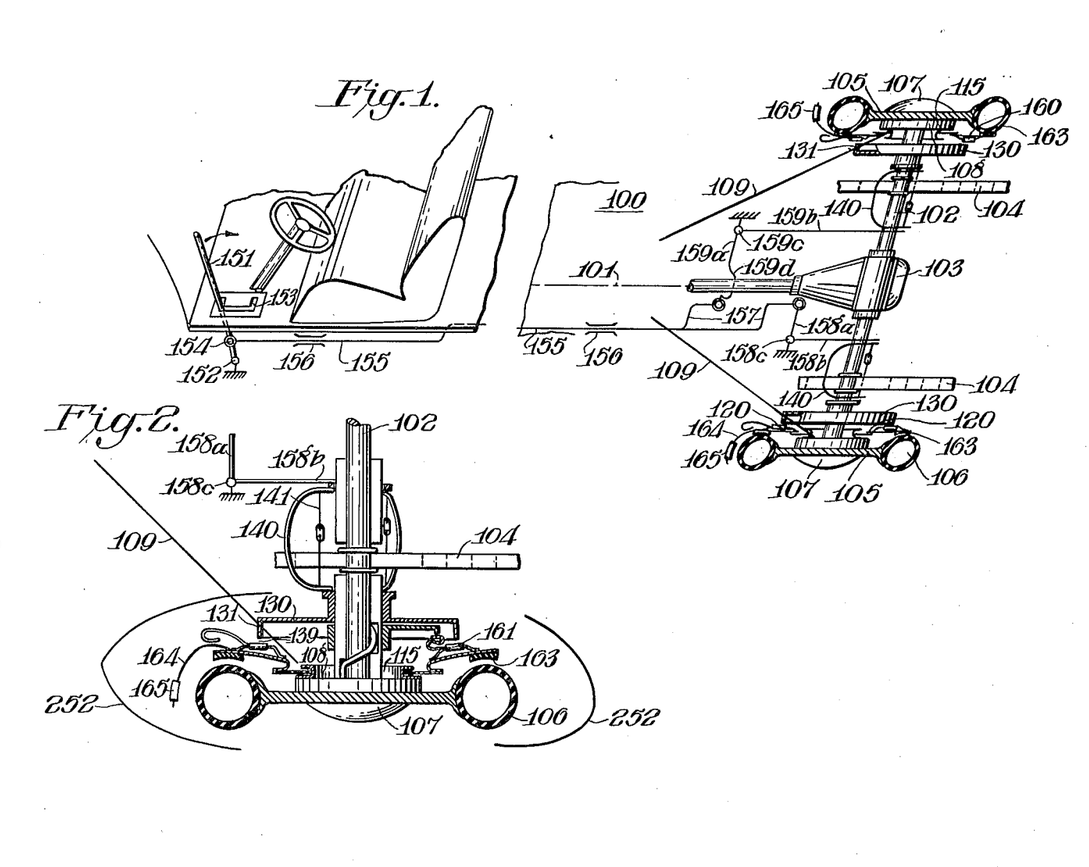
FIG. 1 is a diagrammatic perspective layout of the complete system of my invention, viewed broadside from a point outside the automotive vehicle and on the left side of it.
FIG. 2 is a top view, largely diagrammatic, of one corner of the layout shown in FIG. 1, on an enlarged scale.

Taking up now the drawings in detail,

FIG. 1 shows generally and in symbolic style one, wholly mechanical, practical form of this invention. An automobile, designated generally by the numeral 100, has its body and frame removed. We therefore see its rear axle housing 102, passing through the differential housing 103, and bearing on each side of the symmetry line 101 leaf springs 104 and wheels 105, whose tires 106 are shown in horizontal section. The wheels also bear the customary hub caps 107 and brake backing plate 108. From the latter, in turn, cables 109, which serve to operate the parking brake, run toward the front of the car.

By this invention, a clutch disk 120 is mounted rotatably in the groove of a stationary disk 115 affixed to each brake backing plate in such a manner that the clutch disk can revolve freely around said disk 115 without interfering with the parking-brake cables 109. Further along the axle inwardly (i.e. toward the axis of symmetry) is mounted slideably (on each side) a circular pressure pan 130, whose transverse rim 131 can be made to press against elastic outer member 160 mounted along the rim of clutch disk 120, whereby to press faces 163 of these members against the sidewall of the adjacent tire. This action compels disk 120 to revolve with the tire, carrying along with it friction fingers 165 which are now pressed against the tread of the tire by the same action of pressure pan 130. In this fashion, the friction fingers reach the bottom and become interposed between tire tread and snow (or ice) once during each revolution.

To move each pan 130 into pressure asserting position, a spring 140 is mounted on the axle housing so as to span and clear the car's leaf spring attachment. Spring 140 is shown as a single leaf-spring in FIG. 1, but may also consist of an assembly of 2 or 3 springs spaced conveniently around the axle-housing, as in FIG. 2, to equalize the pressure on the hub of pressure pan 130 and, through it, on master disk 120. These springs may also be of coil form or any other form which by itself or jointly with suitable braces is adapted to transmit pressure lengthwise of the car axle while clearing the leaf spring suspension braces.

The inward end of spring 140 is attached to or acted upon by the end of a lever assembly, which is operated by the driver from his seat through lever 151, which is hinged at 152 (on a pivot affixed immovably to some stationary part of the vehicle). In passing through the floor, lever 151 passes through a metallic face plate having a C-shaped groove 153, so that it may be locked in position at either end of its displacement, by the driver. A spring, not shown, may be provided to assist in holding this lever locked in the upper or lower of these two positions until the driver chooses to work the lever. Pivot 154 near the end of the lever 151 pushes a pipe (or unbendable rod) 155 through lubricated guide channels 156, 156, toward the rear of the car. In the vicinity of the rear axle, pipe 155 is provided with suitable side arms 157, 157, one of which exerts a thrust (rearward with respect to the body of the vehicle) against arm 158a of a bent lever 158 on the left side of the axis of symmetry, and one, against the arm 159a of a similar (but larger) lever on the right side. Arm 159a is bent downwards at 159d, to clear the housing of the transmission shaft. The two arms 159a and 159b of lever 159 are in the same proportion as those of lever 158, so that the pressures transmitted and the distances through which arms 159b and 158b move shall be the same.

It will be clear, of course, that guide channels 156, 156 and pivots 158c and 159c are affixed immovably to some part of the car which is stationary with respect to the rear axle, for instance, the transmission-shaft housing, the frame or the underside of the car floor. If they are attached to the frame or car floor, provision will, of course, be made for free vertical movement of the pipe inside its guide channels (which would then have the shape of vertical slots) as the frame or body itself rocks vertically on the car springs. Alternatively, provision for free vertical displacement may be made at the points where side arms 157 of rod 155 come in contact with lever arms 158a and 159a or where lever arms 158b and 159b are connected to springs 140.

Spring 140 bears a restraining brace 141 (FIG. 2) so that its range of expansion can be adjusted, whereby it will transmit pull from the lever assembly (as lever 151 is put into the inactive position of its C-groove) to pressure pan 130, to provide thereby a clear gap 139 between the transverse rim of the latter and rollers 161 when the system is not set for operation.

In view of the complexity of any drawing showing the assembled mechanism, as in FIG. 2, further details on its construction can best be learned by tracing the assembly operation step-by-step, as shown in FIGS. 3 to 20.

Figure 3:
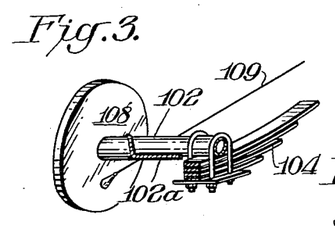
FIG. 3 shows in perspective and partly in section a portion of a typical automotive vehicle, embracing the left rear brake backing plate, a portion of the rear axle housing and of the main leaf spring attached to it.
Figure 4:
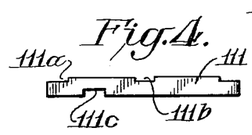
FIG. 4 is a side view of one of the cleats used in building up the axle housing, prior to mounting thereon the other elements of this invention.
Figure 5:
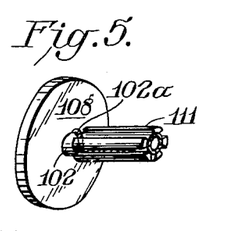
FIG. 5 is a perspective view of the brake backing plate and axle housing after building up.

In FIG. 3, which shows the left rear brake backing plate 108 together with a portion of the rear axle housing 102, we see a portion of a typical automobile structure, before any parts of this invention are applied to it. It will be noted that the axle housing (in addition to having normally an unfinished outer surface) is generally loaded with various attachments, such as car spring 104 and brake-fluid conduit 102a, which would interfere with the sliding of any contemplated mechanical elements lengthwise of the axle. Therefore, the first step in assembling my invention is to build up this portion of the rear axle housing by encircling it with a plurality of spaced, hard rubber or wood cleats 111 as shown in FIGS. 4 and 5.

Each cleat 111 is provided with shoulders 111a or grooves 111b around which metal straps or wires may be wound, whereby to fasten the assembly of cleats securely to the axle housing. As shown in FIG. 5, the cleats are spaced so as to shun obstructing elements (such as hydraulic conduit 102a) fastened to the housing; and in addition, each cleat is notched on the underside (as at 111c in FIG. 4), in individually suited locations, to jump across such obstructions where necessary.

Figure 6:
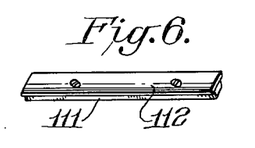
FIG. 6 is a perspective view of one of the cleats placed around the axle housing, after a surface-finished sliding track has been attached to it.

Each cleat may now be covered on top with a suitably arcuated metallic plate 112 (FIG. 6), whose outer surface is properly finished off to provide a smooth, sliding track capable of being lubricated. These plates may be united and further fastened in place by running around the whole plurality of them suitably countersunk metallic bands or wires, so as not to interfere with their smooth sliding surfaces.

A similar set of circumferentially spaced cleats and sliding plates may be provided (if needed) in the section of the axle housing between leaf-spring 104 and differential housing 103.

Figure 7:
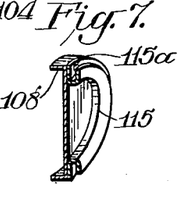
FIG. 7 is a perspective, in vertical section, of the rear left brake backing plate having attached thereto the circular grooved track plate 115, according to this invention.

The next step in the assembly is to fasten to the brake backing plate 108 a circular grooved track 115 as shown in FIG. 7. This track is preferably made up in two halves, so that it can be affixed to the back plate 108 (by means of countersunk screws 115a) without taking the wheel and backing plate off the axle. (When my invention is applied to an automobile while the latter is being assembled in the manufacturing plant, this special provision is, of course, not necessary.)

Figures 8, 9, 10, 11, 12, 13, 14:
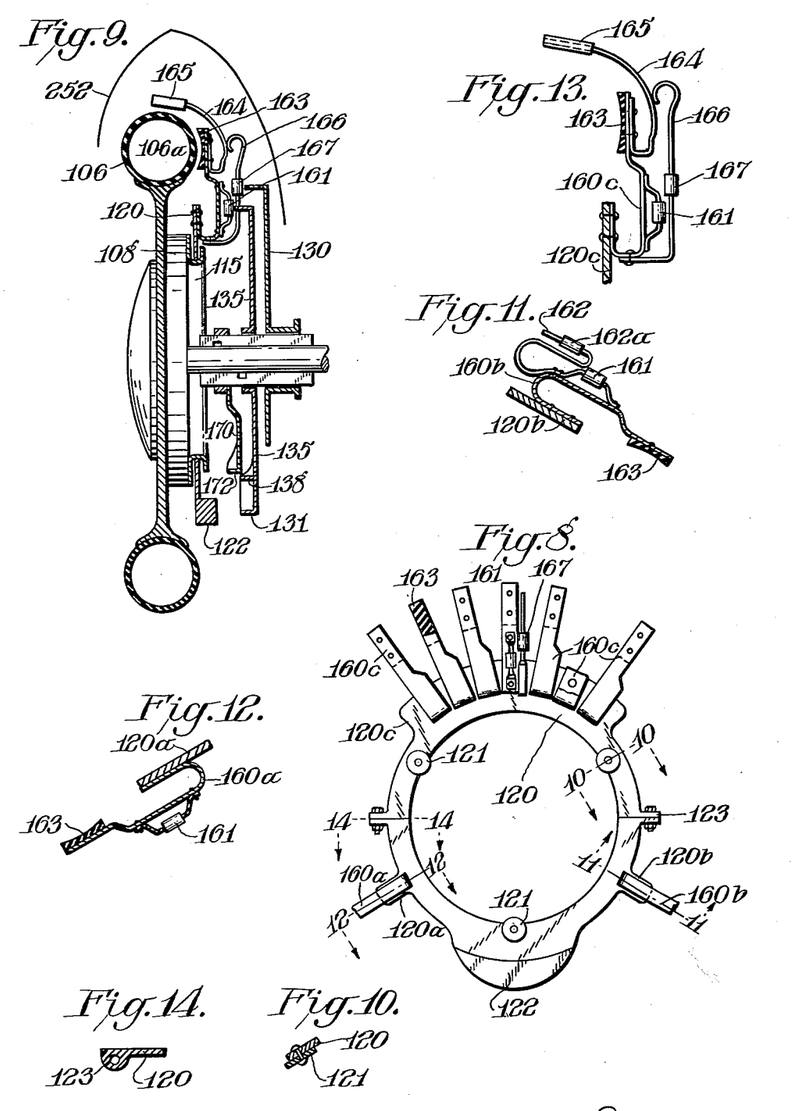
FIG. 8 is a front view of the master disk (clutch and friction plate) 120, of this invention, the view being taken from a point near the midpoint of the rear axle facing the left wheel.
FIG. 9 is a vertical view, partly in section, of the left rear wheel of an automobile and an adjacent portion of the rear-axle housing, bearing on it an assembly of the essential elements of this invention.
FIGS. 10, 11, 12 and 14 are sections through disk 120 taken along lines 10—10, 11—11, 12—12 and 14—14, respectively, of FIG. 8.
FIG. 13 is a detailed side view of one of the clutch and friction-finger elements carried by master disk 120.

Next comes the main operating plate or master disk 120, which is detailed in FIGS. 8 to 14. Disk 120 is cut out in the center to provide a circle of sufficient width to enable the disk to be mounted revolvably in the groove of stationary disk 115. To assist in free rolling, small disk wheels 121 are mounted on one face of disk 120, as shown in FIGS. 8 and 10. It will be noted that the wheel disks 121 protrude slightly beyond the inner circular edge of disk 120, so as to prevent the latter from making contact with the bottom of the groove in disk 115.

The lower edge of disk 120 in FIG. 8 is weighted, as by arcuate massive protrusion 122; this serves to bring disk 120 into the position shown in FIG. 8, when it is free to revolve.

Disk 120 has 3 outward brims or extensions 120a, 120b and 120c, each of which carries bent metallic ribbon springs 160, of configurations as shown in FIGS. 11, 12 and 13. Spring 160a (FIG. 12) is a U-shaped member, one leg of which is attached immovably to brim 120a, while the other leg is somewhat extended and carries on one side a roller 161, and on the other side, a little higher up, a friction pad 163. Roller 161 is situated in a position to receive the pressure of rim 131 of pan 130 when the latter is moved in toward the wheel by the action of lever assembly 151—159. Friction pad 163 is situated in a position to contact sidewall 106a of the tire. Spring 160b (FIG. 11) is of essentially the same design as 160a, but carries further a spring 162 which is designed to engage a notch in stationary hoe-shaped member 170 (to be described below) for the purpose of locking disk 120 in the upright position shown in FIG. 8, when said disk is in its inactive position. Member 160c, shown in detail in FIGS. 9 and 13, also has its basic portion of essentially the same design as member 160a, but the friction pad 163 which it carries extends outward far enough to reach past the midpoint of the tire sidewall 106a. Friction pad 163 may be for instance a piece of leather or hard rubber, or a pad of rubberized fabric. When rim 131 of pressure drum 130 presses against rollers 161 (of all elastic U-shaped members), each friction pad presses against the side wall of the tire, and acting as a clutch it compels main disk 120 to rotate with the tire.

On the opposite face of said extension of spring 160c is attached another U-shaped spring 164, whose free leg extends outwards and bends considerably over the upper tread of tire 106. This spring carries at its free end a "friction finger" in the form of a roller, cleat or pad 165, which again can be made of hard rubber, fabric-reinforced rubber, rag material, door-mat material, wood or may even be a segment of a metal chain, and may be serrated, notched, spiral-grooved, or roughened in any desired manner, whereby to cause considerable resistance to sliding on ice or in a snow pile, when it comes between tire tread and ground.

Spring 164 and its extension are designed so that the friction-pad 165 normally hangs in cantilever fashion over the top of the tire without touching it. When, however, pressure is applied against rollers 161 sufficient to initiate clutch action at friction pad 163, member 165 is likewise carried forward and bends over to the point of resting against the tire tread surface. To assist in bending over, a third spring member 166, made of thicker or stiffer spring material than member 164, is also attached to the free-end extension of spring 160c, so as to push member 164 forward and downward with a positive force, to insure contact with the tire surface.

Spring member 166 may carry a roller 167 for contact with a second rim on pressure disk 130, concentric with rim 131, as will be described further on.

It will be noted that while there is (or need be) only one each of spring members 160a and 160b, there is a plurality of spring members 160c, say five, seven or more, each carrying a friction finger 165, and the assembly spreading out over an angle of about 90 to 150° of the circumference of disk 120.

Disk 120 will again have to be made in two (equal or unequal) halves, to be joined together in any convenient manner after being put in place in the groove of disk 115, for instance by means of bolted lateral lugs as shown at 123 in FIGS. 8 and 14.

Figure 16:
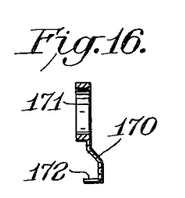
FIG. 16 is a sectional view along line 16—16 of FIG. 15.
Figure 17:
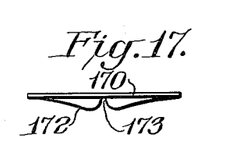
FIG. 17 is a geometrical development of the cam-like rim of the hoe-shaped member in FIG. 15.

Next in the line of assembly on the axle housing is a stationary partial disk 170 (FIGS. 15 and 16) bearing in hoe fashion a transverse blade 172 along its free edge. This blade, developed on a plane surface in FIG. 17, acts like a cam to guide elastic end 162 of the spring shown in FIG. 11 and to trap it eventually in groove 173, whereby to lock the entire disk 120 with its attachments in its position of rest, which is the position shown in FIG. 8. But when rim 131 of pressure pan 130 is pressed against roller 161 of FIG. 11, free end 161 is dislodged from its groove, and disk 120 becomes free to revolve in the groove of stationary disk 115. It will be noted that the hub of member 170 is split in halves (joinable at 174) for mounting, and that it is positioned at an angle so as to be symmetrical with respect to the position of exension 120b on disk 120 when the latter is in its position of rest.

Figure 18:
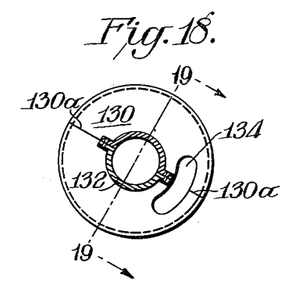
FIG. 18 is a front view of the pressure pan in my device, looking from a point near the differential housing toward the left rear wheel.
Figure 19:
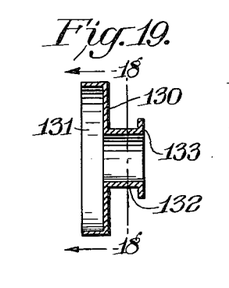
FIG. 19 is a sectional view of the same member along lines 19—19 of FIG. 18.

Next in line of assembly is pressure pan 130 with its rim 131, shown in FIGS. 18 and 19. This pan is mounted to slide along the axle housing but not to rotate. Hub 132 terminates in flange 133 to receive the pressure from spring 140 (FIG. 2). A hole 134 may be cut out in disk 130 to allow undisturbed passage to emergency-brake cable 109, if need be. In such event, the separation line 130a of member 130 for mounting purposes is preferably run through the area of hole 134 (FIG. 18).

Figure 15:
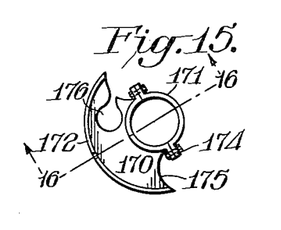
FIG. 15 is a front view of the next member of the assembly along the axle housing, looking from a point near the rear left wheel toward the differential housing.

For similar purposes, the back wall of member 170 in FIG. 15 is indented deeply at its shoulders 175, and may be further provided with a cut-out pocket 176, if necessary. (It will be understood that the location and direction of said cable, as well as of any other obstruction along the axle housing, will vary from one make of car to another. Therefore, only general provisions can be made here, and the precise layout of each member of the assembly of this invention will have to be designed specifically for each make or model of auto vehicle.)

Figure 20:
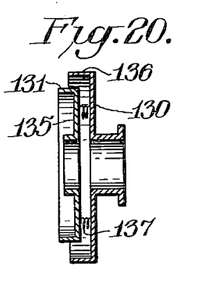
FIG. 20 is a sectional view of a modified pressure pan that can be used in this invention.

In FIG. 20, an optional two-rim form of pressure pan is illustrated. The extra rim 136 is intended to press upon rollers 167 of members 160c in FIG. 13. Moreover, while mounting both rims 131 and 136 to the same backing plate 130 is a feasible alternative, FIG. 20 suggests a preferred design, wherein each rim is carried by an independent back plate. Moreover, between plate 135 which carries the now inner rim 131 and plate 130 which carries the outer rim 136, light springs 137 are provided. The result is that as pressure pan 130 moves in toward the tire, rim 131 will first contact and press upon roller 161; then springs 137 will begin to compress and rim 136 will move forward to press upon roller 167 of FIG. 13. Consequently, a very brief time interval is introduced between the instant when clutch pad 163 comes in contact with the tire side wall (FIG. 9) and that when friction fingers 165 come down to rest against the tire tread.

Following the pressure pan, comes spring 140 (FIG. 2) which may consist of one, two or three ribbon springs distributed around the axle housing in a fashion to span any obstacles which intervene between their end points. When the assembly is at rest, one end of each spring 140 is contiguous to the face of flange 133 of the pressure drum (FIG. 19). The spring may be spaced off a minute distance from this flange or may touch it but without pressure, this effect being achieved by the aid of adjustable restraining brace 141.

The other end of each spring 140 is contiguous to (or may be physically connected to) the free end of lever arm 158b (FIG. 2), which may be forked and bent around the axle housing to facilitate contact with each of the springs 140 when there are more than one. But when said lever arm begins pressing on the ends of springs 140, the latter move promptly into pressing contact with flange 133, and start pushing drum 130 toward the wheel, it being understood that restraining strap 141 (being of a swivelling turnbuckle type common in screen doors of houses) permits free contraction of spring 140 but not expansion beyond a predetermined span.

The description above dealt specifically with the assembly for operating on the left rear tire. It will be understood that the assembly for the right rear tire consists of elements which are built on the same principles but are essentially mirror images of those used for the left side, except where due to local conditions slight modifications may be needed to clear some special obstacles. An illustration is lever 159, whose arms $a$ and $b$ must be larger than (but in the same proportion as) those of lever 158, and which must have a depression $d$ in arm $a$, to get around the drive shaft housing, because it is not convenient to locate sliding pipe 155 exactly along the line of symmetry of the vehicle.

The operation of the entire device will now be readily understood. If the driver wants to start from snow covered ground or if while travelling he is approaching a snowy or icy patch of pavement, he pulls lever 151 (FIG. 1) and locks it in the lower horizontal bar of C-notch 153. Pipe 155 then operates levers 158 and 159 whereby the springs 140 on both sides of the differential housing contract and press, through the respective pressure members 130, against the elastic U-shaped springs of the master disks 120, and couple clutch pads 163 with the respective tire side walls. Disks 120 then start revolving with the rear wheels, while friction fingers 165 (simultaneously or immediately afterwards) bend down into contact with the tire treads. As these fingers reach the nadir of their revolution, they come between tire tread and ice (or snow) and act as ordinary antiskid chains to retard or completely eliminate idle spinning of the wheels.

When the vehicle has reached clean, dry pavement, where chains would no longer appear necessary, the driver moves back lever 151 and locks it in the upper bar of C-notch 153. This releases the pressure from elastic members 160a, b and c, and the free ends of the latter spring back, disengaging clutch pads 163.

The sudden release of all strained spring members 160a, 160b and 160c will in most cases be sufficient to push back the pressure pans 130, and through them also springs 140 and levers 158, 159 to their neutral positions. But if desired, relatively weak springs (not shown) may be provided along the axle housing to assist in this return movement of the several slideable elements of the assembly. (Compare spring 239 in FIG. 37.)

If at the moment of pressure release master disk 120 is not in the vertical position shown in FIG. 8, the inertia of weight 122 will continue its rotation until elastic spur 162 of member 160b (FIG. 11) engages the edge of cam 172 on member 170 (FIGS. 15–17) and falls into notch 173, thereby locking disk assembly 120 against further rotation. The device is now in a position for renewed application.

In FIGS. 21 to 27 a modified form of this invention is shown wherein the clutching action and the friction-finger action are combined in the same unit and the latter is of a hydraulic nature.

Figure 21:
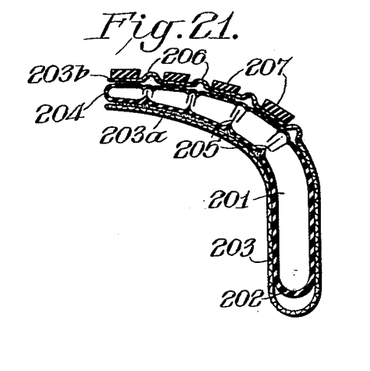
FIG. 21 is a side view in section of a modified friction-finger and clutch unit for use in this invention.
Figure 22:
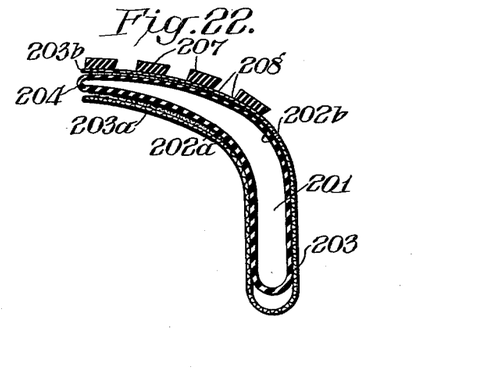
FIG. 22 is a side view of a similar unit further modified.

In FIG. 21 is shown a completely sealed, partially bent, elastic tube 201, having a vertical bulb portion 202 from which it tapers to a relatively narrow diameter at the opposite end, and being filled with some unfreezable liquid (such as alcohol or glycol) which is not injurious to the material from which the tube is made (say, natural or synthetic rubber). The tube is protected by a vertically extending ribbon 203, which is made of heavy canvas or rubberized fabric and is slightly wider than the tube. Said ribbon may be U-shaped, to encircle the bottom of the tube as shown in FIG. 21, or it may consist of separate lower and upper strips 203a and 203b. The upper, tapered portion 204 of the tube is bent toward the horizontal, and contains flexible folds or creases 205 which run transversely of the tube. The lower face of portion of 204 is cemented throughout, in creased condition, to canvas strip 203a, and therefore cannot expand. The top of portion 204 is either altogether free or is cemented to canvas strip 203b at points intermediate the creases 205 only. Canvas strip 203b itself is provided with expandable folds 206, spanning the rubber creases. Accordingly, the top side of portion 204 of the tube is free to expand longitudinally. (The same effect may be achieved without creases, by casting the tube initially with a massive dorsal wall 202a but a relatively thin and flexible back wall 202b as shown in FIG. 22. Also, the upper portion of the protective canvas strip 203 may be made of altogether disjointed strips 208, as shown in the same figure.) Accordingly, if pressure is applied against bulb 202 whereby to force part of its liquid into the upper portion of the tube, the creases in the latter will tend to unfold to accommodate the incoming excess liquid. But because only the upper portion of each crease can unfold (or only the upper wall of the tube in FIG. 22 can yield), the result will be an automatic bending of the finger downwards.

Figure 23:
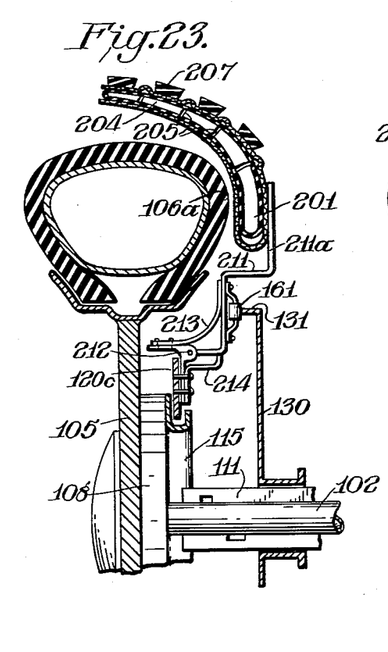
FIG. 23 is a vertical section of the upper portion of the rear left wheel of an auto which is equipped with the modified form of the unit shown in FIG. 21, the entire assembly being in the inactive position.
Figure 24:
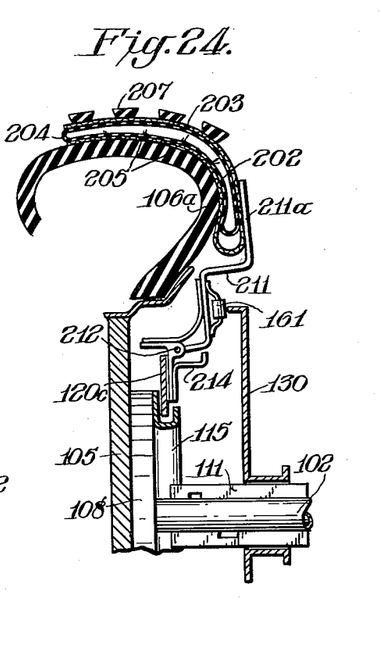
FIG. 24 is a similar view showing the position of the assembly at the start of action.
Figure 25:
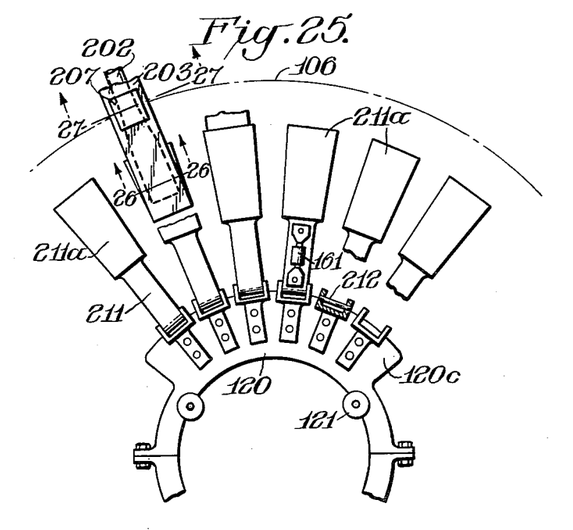
FIG. 25 is a side view of the assembly discussed under FIG. 23 (with parts broken away), looking from a point near the mid-point of the rear axle toward the left wheel.
Figure 26:
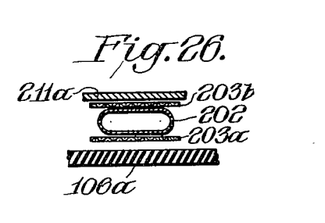
FIG. 26 is a section along lines 26—26 of FIG. 25.

As shown in FIGS. 23 and 25, a plurality of such fingers are supported opposite the tire wall (in the upper portion of the tire) on individual metal members 211 which are hinged at 212 to brim 120c of disk 120 (FIG. 8), in lieu of the elastic metallic members shown in that figure. A spring 213 holds each member 211 against a fixed support 214, when the entire device is in position of rest. In this position, the bulb portion of tube 201 (and its protective canvas) is slightly spaced off from the tire wall 106a. But when rim 131 of pressure pan 130 moves in against roller 161, the upper portion 211a of member 211 (which is tall and broad enough for this purpose) moves finger 201 into contact with tire wall 106a and presses against the entire vertical area of bulb 202, achieving thereby two results: The body of the bulb portion, through its friction-surfaced, canvas protecting layer, acts as a clutch against the face of tire wall 106, and upper portion 204 bends down, fingerwise, and rests firmly against the tread of the tire, as shown in FIG. 24.

To further protect tube 204 against wear and to achieve a better bite into the snow (or a better grip on ice) cleat members 207 made, say, of hard rubber, or yarn-reinforced, tire-sidewall material, are secured to the canvas portions 208 in FIG. 22, or between the folds of canvas 203 in FIG. 21.

The cleat members themselves are discussed with greater detail in FIGS. 27 to 30.

Figure 27:
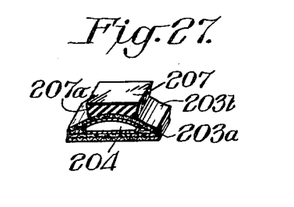
FIG. 27 is a section along lines 27—27 of FIG. 25.

The side faces of the cleat may be vertical, or they may be made overhanging, as shown at 207a in FIG. 27, to increase their bite and their resilient resistance to skidding.

Figure 28:
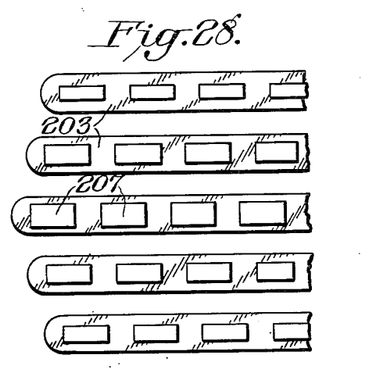
FIG. 28 is a top view of an assembly as shown in FIG. 24, suggesting one form of layout for the fingers and cleats discussed under FIGS. 21 to 27.
Figure 29:
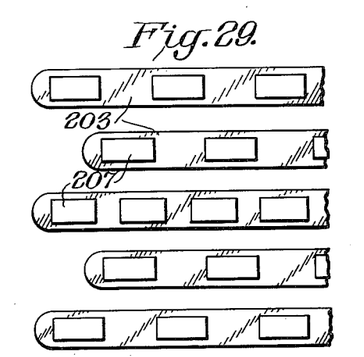
FIG. 29 is a top view showing another, optional form of layout.

The number of cleats as well as their width may be varied from one finger to the next, as shown in FIGS. 28 and 29. (The length and height of each cleat may also be varied, leading up perhaps from a relatively low or medium height at the edges of the pattern to a maximum height at the middle.) Or the cleats may be staggered, with or without long blanks from one to another on the same finger, as shown in FIG. 29.

Figure 30:
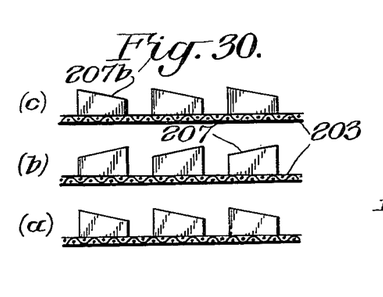
FIG. 30 is an assembly of three side views (*a*), (*b*) and (*c*) of the fingers discussed in FIGS. 21–29, showing an optional mode of fashioning the tops of the cleats.

Or again, the top 207b of each cleat may be made slanting and the direction of the slant may be reversed from one finger to another, as shown in FIG. 30, which incidentally is not a top view on the assembly of fingers but rather three side views (a), (b) and (c) of three adjacent fingers.

As will be understood, many variations and modifications in the above embodiment of my invention may be made while retaining the basic principles thereof. Thus, in lieu of the lever assembly 151—155, hydraulic or other means producing the same effect may be employed.

Figure 31:
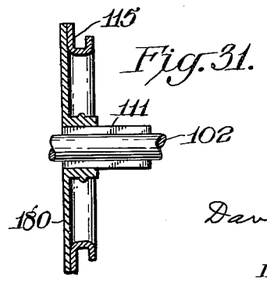
FIG. 31 is a vertical view, partly in section, of a modification of this invention, wherein the mode of mounting circular track 115 is independent of the brake backing plate.

In lieu of affixing circular track disk 115 to the brake backing plate, it may be mounted on an independent steel plate fastened immovably to the axle housing, in the vicinity of the brake backing plate, as shown for instance at 180 in FIG. 31. It will be noted that the inner diameter of track disk 115 is made large enough to get around the emergency-brake cable 109, so that master disk 120 (and any attachments which it bears) may revolve freely in the grooved track 115 without tangling with or obstructing the action of said cable.

Figures 32, 33, 34, 35, 36, 37, 38, 39:
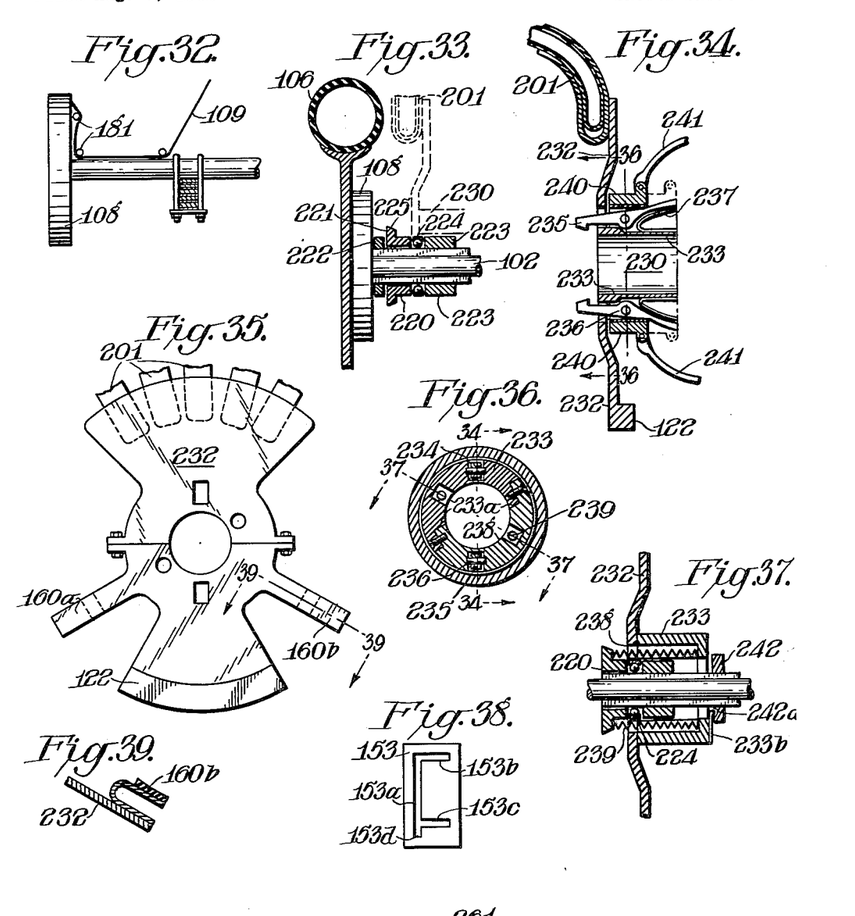
FIG. 32 is a vertical view of a portion of the rear axle housing and left rear brake backing plate, illustrating a method of relocating the emergency-brake cable, to enable the further modification of this invention according to FIGS. 33 to 38 which follow.
FIG. 33 is a vertical view, partly in section, of the rear axle housing and left rear tire, showing a modified form of this invention.
FIG. 34 is a detail, in vertical section, of member 230 shown in dotted lines in FIG. 33. The section is taken along line 34—34 of FIG. 36.
FIG. 35 is a side view of plate 232, looking to the left of FIG. 34.
FIG. 36 is a rear view of member 230, looking toward the left in FIG. 34.
FIG. 37 is a vertical section of assembly 230 (shown in FIG. 34), taken along line 37—37 of FIG. 36.
FIG. 38 is a top view of a modified form of metal plate 153 of FIG. 1.
FIG. 39 is a section along lines 39—39 of FIG. 35.

The problem of clearing the emergency brake cables can be eliminated altogether by relocating the same, for instance as shown in FIG. 32, wherein cable 109 is redirected by pulleys 181 to run along the axle housing (between cleats 111 of FIG. 5) and then vertically along the brake backing plate. Such relocation is particularly convenient in the initial design and assembly of the automotive vehicle, and when thus achieved it offers a valuable opportunity of further modifying and simplifying the device of this invention. Such a modification is shown in FIGS. 33 to 38.

This modification comprises first of all a hub 220 rotatable freely on the built up (and smoothened) axle housing 102, and separated from brake backing plate 108 by stationary collar 222, affixed to the axle housing. On the opposite face thereof, hub 220 abuts through rollers or ball bearings 224 against a stationary collar 223 affixed to the axle housing. The outer circumferences of members 220 and 223 are finished off to the same height, so that cylindrical member 230 (of FIG. 34) can slide freely over the two of them. But on the end facing the backing plate, hub 220 bears a sturdy flange 221 whose rim 225 is inclined rearwards to provide an easy, sliding surface for a catch hook 235 to be described below.

Surrounding the combination of members 220 and 223, but situated normally in a retracted position, as indicated by the dotted lines in FIG. 33, is a master disk and hub 230, shown in FIG. 34. It comprises hub 233 of a diameter just fitted for easy sliding over members 220 and 223. On the end facing the tire, it carries a sturdy disk plate 232, essentially as shown in FIG. 35, and corresponding in function and attachments to disk plate 120 of FIG. 8. It carries on top (in the position of rest) clutch-and-friction fingers 201, say, of the hydraulic type shown in FIG. 23; on the bottom it carries a weight 122 (as in FIG. 9), and on the sides below the midpoint it carries U-shaped elastic clutch members 160a and 160b as shown in FIG. 39.

Hub 233 of member 230, shown in section in FIG. 36, is made in halves, fastened together at 233a, and possesses two (or three, if desired) grooves 234 in which are hinged (at 236) catch hooks 235, which are urged into their locking positions by springs 237. The head of each catch hook 235 protrudes beyond the face of plate 232 and is situated to slip over slanting rim 225 of the flange of member 220. Thus, when assembly 230 is driven in by a substantial force from its dotted position in FIG. 33, toward backing plate 108, hooks 235 will lock onto flange 221 of rotating member 220 and, while pressing tube 201 against the sidewall of the tire, they will exert a back thrust through roller bearings 224, against the face of stationary collar 223. At the same time, tube 201, acting as a clutch, will cause the plate 232, hub 233 and rotating member 220 to rotate, as a unit, with the tire.

The necessary force may be applied by an electromagnet or by a lever device pressing ring 240, through jointed or fixed levers 241 against the back of plate 232. When it is desired to discontinue the action of fingers 201, the lever (or electromagnet) device is reversed so as to exert pull on ring 240. The latter, slipping back over hub 233, depresses the tails of catch hooks 235, causing disengagement of the latter from the flange of member 220. The pressure of the tire sidewall against clutch tubes 201 will in many cases be sufficient in itself to drive back the assembly 230, but this action may be augmented by further modifying hub 233 as shown in FIG. 37, wherein additional grooves 238 are made on the underside of the hub, open at the end facing the wheel but closed at the opposite end, in which grooves springs 239 are located.

As hub 233 withdraws while ring 240 stands still (in its withdrawn condition) catch members 235 are released for renewed action upon subsequent pressing-in of assembly 230 toward the tire. Also, weight 122 acts to return plate 232 to its normal vertical position, and when the latter is reached, a small projection 233b falls into a depression 242a in a stationary collar 242 affixed to the axle housing, and locks assembly 233—232 against further movement until willingly actuated by the driver.

Such actuation, as already mentioned, is effected by pressing ring 240 against plate 232, by the aid of levers 241. The latter may be actuated by a lever system as shown in FIGS. 1 and 2 (omitting spring 140), but in this case it is preferable to modify the metal plate 153 (in the floor of the car near the foot of the driver) to have notches as shown in FIG. 38. Instead of being completely C-shaped, with transverse notches 153b and 153c running transversely from the vertical notch 153a, the latter is now extended downwardly a slight distance below 153c as shown at 153d.

When the driver desires to set the anti-skid system into operation, he pulls down toward himself lever 151 (of FIG. 1) all the way to point 153d, and as soon as he feels that the clutch action of plate 232 has been initiated, he withdraws the lever slightly and locks it in notch 153c. The object of this is to insure that sufficient pressure is initially exerted by the driver to cause catch hooks 235 to slip over flange 221 of FIG. 33. But as soon as this is accomplished, non-rotating pressure-ring 240 is withdrawn slightly, to avoid needless friction and wear against the back of plate 232.

In most automobile type vehicles, the rear wheels are partly covered by fenders 252 which extend upward and inward into the body of the car, forming a sort of hood over each wheel (FIGS. 2 and 9). It will be noted that the apparatus of this invention is designed so that those parts which have a considerable extent in a plane parallel to the plane of the wheel (for instance, masterplate 120 and pressure pan 130) are placed close together and close to the face of the wheel, so that they will fit inside said hood 252, while the hub of member 130 runs closely to the axle housing and can be operated through springs and levers located outside said hood.

The weight 122 on plate 120 and 232 (FIGS. 8 and 35) may be replaced by any desirable combination of springs or electromagnets which will achieve the same result, that is, bring these plates back to vertical position after their clutch engagement with the tire has been broken. Further-more, such devices may be omitted altogether if plate 120 or 232 is made massive enough to continue rotating by inertia until spring 162 (FIG. 11) or projection 233b (FIG. 37) has found its locking depression.

Pressure pan 130 (or 135) may be provided with an arcuate lug 138 concentric with rim 131 (FIG. 9), whereby to dislodge spring catch 162 from its locking position and prevent its reentry into this position as long as pressure pan 130 (or 135) occupies its forward (operative) position. Spring 162 itself may then be provided with a roller 162a (FIG. 11) to slide over said lug 138 easily as plate 120 revolves with the tire.

Figure 40:
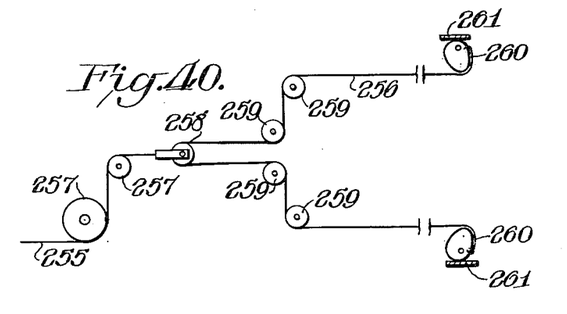
FIG. 40 is a diagrammatic layout as in FIG. 1, showing a modified form of the means operable by the driver for actuating the spin-impeding means of this invention.

Pipe or rod 155 may be made of jointed segments, to enable it to flex in a horizontal plane if need be (as the vehicle executes a right or left turn), or in a vertical plane (as the frame rocks on the car springs). Moreover, pipe 155 may be replaced altogether by a tension member, for instance a system of cables 255, 256 (as shown in FIG. 40), running over suitably placed pulleys 257, 258 and 259 and whose ends wind around eccentric ovals 260, whereby to exert pressure against plates 261 as pulley 253 is pulled forward. Plates 261 in this figure may represent the inner ends of springs 140 in FIGS. 2 or the flanges of rings 240 in FIG. 34. Spiral springs (not shown) centered on the pivots of ovals 260 are then provided to return said ovals to their inactive position when the tension on cable 255 is relaxed.

In this case, of course, the positons of pivots 152 and 154 of FIG. 1 are reversed, the upper pivot being now made the stationary pivot, while the end of cable 255 is attached to the lower pivot, which is now movable.

While the several modifications discussed hereinabove have friction fingers of types which actually interpose a friction element between the tire and the ground once during each revolution of the wheel, and while such construction may have the advantage of being positive in action and effective in essentially all conceivable conditions (snow, ice, water-wet pavement, etc.) my invention may nevertheless be constructed with a simplified type of friction device, wherein the increased friction is created not exactly under the tread of the tire but in a line running parallel thereto. Several such modifications are shown in FIGS. 41 to 45.

Figure 41:
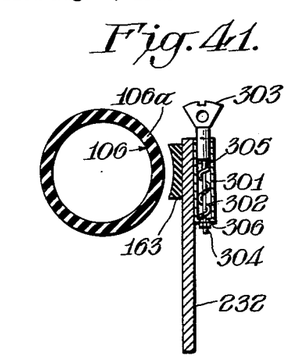
FIG. 41 is a view in vertical section of a modified form of the friction-increasing means according to this invention.

In FIG. 41, 232 is rotatable plate of the same type as used in FIGS. 33 to 35. It carries a clutch device 163 (rubber pad or liquid tube) on the side facing the tire wall 106a. But in lieu of the friction finger construction used in FIG. 34 (or 23), the plate here bears members 301, each of which comprises an oblong, radially disposed, hollow metal tube containing spring 302, in which is yieldingly supported a friction finger having a friction cap 303, shank 304 and shoulder 305 bearing against said spring. Friction cap 303 may be made of aluminum, wood, rubber, or any elastic, drag resisting material and shank 304 is threaded at the end and bears a tension nut 306. Normally, cap 303 will be substantially flush with the outer diameter of the tire or will extend slightly (say ¼ to 1 inch) above it. As the tire reaches the nadir of its revolution, it flattens and its outer diameter decreases. Therefore, cap 303, whether originally flush with the tire or extending slightly beyond it, will (if the plate is coupled to the tire wall) bite into the snow or icy surface, receding as necessary, against the action of spring 302, and the friction thus produced will have a retarding effect on the tendency of the wheel to spin.

Figures 42, 43:
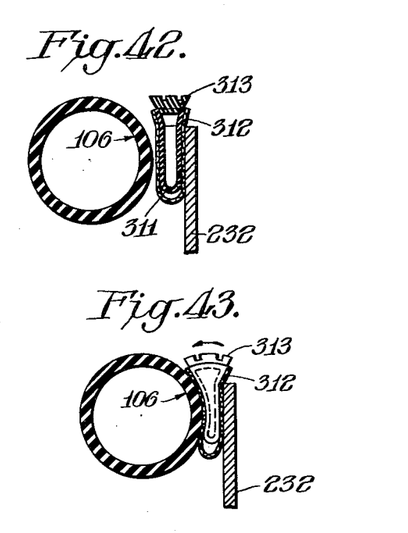
FIGS. 42 and 43 are similar views of another modification of said means, FIG. 42 showing the inactive position and FIG. 43, the position at the start of action.

In FIGS. 42–43, the same effect is produced by providing the plate with radially extending tubes filled with a liquid and which combine the functions of clutch device and friction finger, on the same principle as in FIGS. 21 to 24. But instead of having a portion bending over the tread of the tire, tube 311 here is relatively straight (in the radial direction of the plate) and ends on top in a dilatable portion 312, which is capped by an indented rubber cleat or crown 313. As plate 232 is pressed against the sidewall of the tire, liquid from the lower portion of the tube is forced into the upper portion, dilating it and causing it to fill more or less the gap between plate 232 and the tire wall. The result is as if the tire has suddenly acquired extra width of tread. Friction increases, and free spinning becomes impeded.

Figure 44:
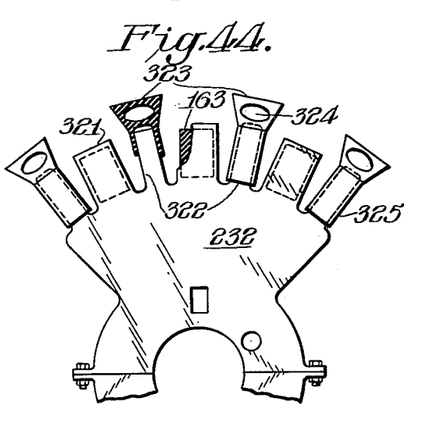
FIG. 44 is a front view of a master disk according to FIG. 35, looking axlewise toward the wheel, but modified to show still another form of friction-increasing means according to this invention.
Figure 45:
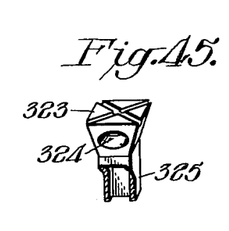
FIG. 45 is a perspective view partly in section of the rubber cap employed as friction-increasing means in FIG. 44.

A third modification is shown in FIGS. 44–45. Plate 232 is here serrated on its periphery to provide relatively wide plates 321 which carry clutch pads 163 on the side facing the tire, and relatively narrower posts 322 on which are mounted caps 323, which may be made of rubber or other elastic drag resisting material. These caps are preferably built with holes 324 running transversely thereof, so as to make them elastically yielding under pressure. The tops of caps 323 all lie in a circle of about the same diameter as the tire (say from 0.5 inch below to 1 inch above the upper edge of the tire). When plate 232 is coupled to the sidewall of the tire, and as the wheel rotates, the tire becomes flattened where it touches the ground, and rubber caps 323 being pressed against the ground become flattened out, achieving in effect a temporary widening of the tire tread with resultant increased resistance to free spinning or skidding.

Figure 46:
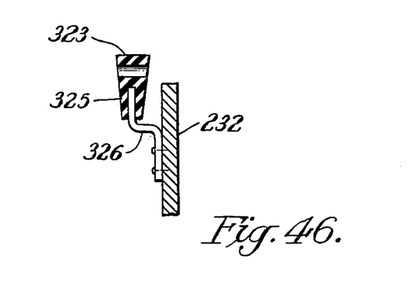
FIG. 46 is a vertical section through the upper part of the master plate of FIG. 44, showing a modified manner of supporting the rubber cap thereon.

It will be obvious that instead of providing posts by serration of the edge of the plate, suitable hooks, vanes, brackets etc. may be provided on one or the other faces of the plate, the supporting portion 325 of cap 323 being correspondingly modified for proper mounting. Such a modification is shown in FIG. 46, wherein cap 323 is supported on a bracket 326 which is attached to one side of plate 232.

It will be noted that in all the modifications of FIGS. 41 to 46, the traction elements (more accurately, their median planes) revolve in a vertical plane which is vicinal to the face of the tire but does not pass through the volume of the tire. Stated in different words, the area where each traction element makes contact with the ground is adjacent to but does not overlap the area of contact between tire and ground.

Returning now to FIGS. 21 to 24, it will be noted that the tube 201 is supported by attachment of its lower portion to plate extensions 211a, which support may be achieved by the aid of metal ribbons, wire, adhesive tape, or any other convenient manner. It is expected that if the tube is made of rubber, initially cast in the bent, finger like shape, and if it is filled with liquid under slight pressure, the whole tube will acquire a certain degree of rigidity and will retain its shape and position in the bent portion 204 as required by FIG. 23. If, in certain cases this is found insufficient, rubber tubing, helical rubber ribbons or light, rubber sponge material may be inserted inside the tube to give it the desired degree of self support without impairing its flexibiliy to the extent required in FIG. 24.

Canvas protective sheath 203 around tube 201 may likewise be supported in the desired conffiguration by direct attachment to plate extension 211a or by adhesive attachment at scattered points to the tube.

Many other details of construction and permissible variations within the general teachings of this specification will be readily apparent to those skilled in the art.

I claim:

1. A device for discouraging the spinning of a wheel of an automotive land vehicle in a bank of snow, said device comprising in combination
   (1) a set of traction elements yieldingly supported in an arc of a circle of about the same diameter as the outer diameter of the tire of said wheel,
   (2) means for supporting said set in a plane parallel to the plane of the wheel and in a position of rest above the axle of the wheel, said means including friction pads adapted to act as a clutch when pressed against said tire,
   (3) means for moving said friction pads into position of clutch contact with said tire whereby said support and set of traction elements become rotatable with the tire, and (4) means operable from the driver's seat for effecting and breaking said clutch contact at the will of the driver, said means for supporting said traction elements in an arcuate pattern comprising a plate rotatable in a stationary circular track, and said traction elements having elastic portions extending beyond the edge of said plate and to an extent essentially flush with or slightly beyond the outer diameter of said tire, whereby the ends of said extensions will make frictional contact with the ground in the course of their rotation when said clutch is in operative contact with the tire.

2. A device for discouraging the spinning of a wheel of an automotive land vehicle in a bank of snow, said device comprising in combination (1) a set of traction elements yieldingly supported in an arc of a circle of about the same diameter as the outer diameter of the tire of said wheel, (2) means for supporting said set in a plane parallel to the plane of the wheel and in a position of rest above the axle of the wheel, said means including friction pads adapted to act as a clutch when pressed against said tire, (3) means for moving said friction pads into position of clutch contact with said tire whereby said support and set of traction elements become rotatable with the tire, and (4) means operable from the driver's seat for effecting and breaking said clutch contact at the will of the driver, said means for supporting said traction elements in an arcuate pattern comprising a plate slideable along the axle housing of said vehicle wheel and rotatable on a smooth collar surrounding said axle housing, said plate carrying said traction elements and clutch means near its periphery on the face thereof which is contiguous to the said wheel tire, and said combination including further (5) means for sliding said plate axlewise until said clutch means make operative contact with the sidewall of said tire, and (6) means for locking said plate in the position thus attained whereby to compel said plate and the means supported thereon to rotate as a unit with the tire.

3. In combination with a power driven rubber-tired wheel of an automotive land vehicle, said wheel being mounted on a rotating axle which is encased in a nonrotating housing, (1) a plate disposed in a vertical plane and being mounted for rotation on a track surrounding said axle housing, said plate bearing
 (a) a clutch pad near an edge thereof on the side facing said wheel and in a position to contact the sidewall of the tire of said wheel when pressed against the latter, and
 (b) traction elements supported near an edge of said plate and having each an elastic portion extending partly over the tread of said tire, (2) means operable by the driver for pressing said clutch pad against the sidewall of said tire whereby to cause said plate to rotate with said wheel and tire, (3) means for returning said plate to normal inactive position, and (4) means for bending said traction element into essential contact with said tread when said clutch pad is pressing against said tire.

4. As an element in an anti-skid device, a completely sealed tubular elastic member containing a liquid, said member comprising a relatively wide, lower body portion and an extended, relatively narrow upper finger portion, said upper finger portion being shortened on the underside thereof, whereby to give the appearance of a bent finger with respect to said wider body portion, the underside surface of said finger portion being restricted structurally against stretching but not against flexing, while the upper surface of said finger is left free to stretch and flex, to the effect that when liquid is pressed out of said body portion into said finger portion the latter will bend downwardly due to the difference in stretchability between its lower and upper surfaces.

5. An element as in claim 4, the undersurface of said finger portion being restricted against stretching by being adhesively fastened to a nonstretchable fabric.

6. An element as in claim 4, said tubular member being made of a stretchable elastic material, and the undersurface of said finger portion being restricted against stretching by being made substantially thicker than the upper portion.

7. An element as in claim 4, said element being supported near the edge of a plate which surrounds the axle of an automotive vehicle facing a wheel and tire of said vehicle and being adapted to have at least said edge portion thereof move axlewise toward said tire, and said element being disposed on said plate in a position such that the lower body portion thereof will come between plate and tire when said edge portion is pressed against the tire and will act as a clutch between said plate and tire, whereby plate and wheel will rotate as a unit.

8. As an element of a device for inhibiting undesirable motion of a wheel of an automotive vehicle when in contact with slick ground, a plate mounted rotatably on a track surrounding the axle of said wheel and having a sector of essentially circular periphery, said plate carrying clutch pads on one face thereof in positions to make contact with the tire of said wheel, and said sector carrying further a plurality of elastic, drag-resisting elements disposed in an arc of a circle near the periphery of said sector and protruding beyond said periphery, said drag-resisting elements being designed and mounted for yielding radially when pressed inwardly toward the periphery of said essentially circular sector.

9. An element as in claim 8, said drag-resisting elements being mounted for rotation in a plane parallel to the face of the tire but not passing through the volume of said tire.

10. An element as in claim 8, each of said clutch pads and drag-resisting elements being combined in a single elastic element which possesses (1) a body portion fitting between said plate and said tire and (2) a head portion protruding beyond the periphery of said plate and adapted to act as a drag-resisting element.

11. In combination with an automotive land vehicle having a power driven wheel encircled by a pneumatic tire, means supported on a non-rotating portion of the vehicle for increasing the total traction between said tire and ground, said means being normally out of contact with said tire, and further means operable from the driver's seat for moving said traction-increasing means into contact with the tire whereby said means become rotatable with the wheel at the will of the driver, said first mentioned means comprising a plate rotatable in a vertical plane on a track surrounding the axle housing of the wheel and supporting in an arcuate sector thereof, of a diameter essentially equal to the outer diameter of the tire, a plurality of yielding traction elements, said elements being so designed and disposed as to rotate with said plate and contact the ground in areas adjacent to but not overlapping the area of contact of said tire with the ground.

References Cited in the file of this patent
UNITED STATES PATENTS

| | | |
|---|---|---|
| 2,126,961 | Hodgkinson | Aug. 16, 1938 |
| 2,720,237 | Chamberlain | Oct. 11, 1955 |